(12) United States Patent
Shiota et al.

(10) Patent No.: US 10,958,800 B2
(45) Date of Patent: Mar. 23, 2021

(54) MEDIUM TRANSPORT DEVICE AND IMAGE READING APPARATUS WITH TWO-DIMENSIONAL SENSOR

(71) Applicant: SEIKO EPSON CORPORATION, Tokyo (JP)

(72) Inventors: Takayuki Shiota, Kitakyushu (JP); Seiji Eguchi, Kitakyushu (JP); Daisuke Honda, Munakata (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/696,909

(22) Filed: Nov. 26, 2019

(65) Prior Publication Data
US 2020/0177752 A1 Jun. 4, 2020

(30) Foreign Application Priority Data
Nov. 30, 2018 (JP) .............................. JP2018-225055

(51) Int. Cl.
*H04N 1/00* (2006.01)
*B41J 13/00* (2006.01)

(52) U.S. Cl.
CPC ...... *H04N 1/00718* (2013.01); *B41J 13/0009* (2013.01); *H04N 1/00702* (2013.01); *H04N 1/00737* (2013.01); *H04N 1/00803* (2013.01)

(58) Field of Classification Search
CPC combination set(s) only.
See application file for complete search history.

(56) References Cited

U.S. PATENT DOCUMENTS

| | | | |
|---|---|---|---|
| 2006/0159471 A1 | 7/2006 | Yasukawa et al. | |
| 2007/0237558 A1 | 10/2007 | Nakanishi | |
| 2009/0003908 A1* | 1/2009 | Horade | G03G 15/6567 399/395 |
| 2010/0098471 A1* | 4/2010 | Satoh | G03G 15/6567 399/361 |
| 2020/0171856 A1* | 6/2020 | Shiota | H04N 1/00676 |
| 2020/0172370 A1* | 6/2020 | Eguchi | B65H 7/04 |
| 2020/0177751 A1* | 6/2020 | Shiota | B65H 5/062 |

FOREIGN PATENT DOCUMENTS

| | | |
|---|---|---|
| JP | 2003-205654 | 7/2003 |
| JP | 2006-193286 | 7/2006 |
| JP | 2007-276982 | 10/2007 |
| JP | 2019-029794 | 2/2019 |

\* cited by examiner

*Primary Examiner* — Barbara D Reinier
(74) *Attorney, Agent, or Firm* — Workman Nydegger

(57) ABSTRACT

A scanner having a medium transport device has: a medium placement section disposed so as to be exposed to the outside of a cabinet, the medium placement section having a placement surface on which paper to be transported is placed; a supply roller that feeds the paper in a transport direction by being rotated while in contact with a surface of the paper, the surface facing the placement surface; and a two-dimensional sensor disposed in the medium placement section. The two-dimensional sensor has a light emitting section that can emit light toward the paper placed in the medium placement section, and also has a light receiving section that can receive reflected light from the paper. The light receiving axis of the light receiving section intersects part of the cabinet.

8 Claims, 7 Drawing Sheets

MEDIUM TRANSPORT DEVICE AND IMAGE READING APPARATUS WITH TWO-DIMENSIONAL SENSOR

The present application is based on, and claims priority from JP Application Serial Number 2018-225055, filed Nov. 30, 2018, the disclosure of which is hereby incorporated by reference herein in its entirety.

BACKGROUND

1. Technical Field

The present disclosure relates to a medium transport device that transports a medium and an image reading apparatus that reads the medium transported by the medium transport device.

2. Related Art

Some image reading apparatuses that read an image on a medium to be transported and some recording apparatuses that perform recording on a medium to be transported have a detecting section that detects the skew of the medium.

JP-A-2003-205654, for example, discloses an ink jet printer that has a detecting section that uses a motion sensor to detect the skew of a medium.

The motion sensor has a two-dimensional semiconductor image sensor in which pixels are arranged vertically and horizontally. The motion sensor emits light from a light emitting section toward a medium and receives reflected light of the light at a light receiving section to detect the vertical and horizontal motions of the medium.

After the medium has completely passed the motion sensor, the reflected light from the medium disappears and the amount of light received at the right receiving section is reduced. This makes it possible to detect that no medium is present at the position of the motion sensor.

In JP-A-2003-205654, the motion sensor is placed immediately upstream of a print head in a direction in which a medium is transported. For early detection of the skew of a medium, it is preferable for the sensor to be disposed further upstream. When the motion sensor is disposed on a medium tray on which a medium to be transported is placed, it is possible to detect a skew that has occurred immediately after the medium had been fed from the medium tray. It is also possible to detect whether a medium is placed on the medium tray.

In a case in which a motion sensor is disposed on a medium tray in a structure in which the medium tray is disposed so as to be exposed to the outside the main body of the equipment as in JP-A-2003-205654, when no medium is present on the medium tray, light from the outside of the apparatus such as illumination or natural light arrives at the light receiving section. This may cause the motion sensor to incorrectly detect that a medium is present on the medium tray.

SUMMARY

A medium transport device according to the present disclosure that solves the above problem has: a cabinet in which a medium is transported; a medium placement section disposed so as to be exposed to the outside of the cabinet, the medium placement section having a placement surface on which the medium is placed before it is transported; a feeder disposed in the cabinet, the feeder feeding the medium in a transport direction by being rotated while in contact with a surface of the medium placed in the medium placement section, the surface facing the placement surface; and a two-dimensional sensor disposed in the medium placement section, the sensor detecting the motion of the medium in a two-dimensional coordinate system including a first axis and a second axis that extend along the placement surface. The two-dimensional sensor has a light emitting section that can emit light toward the medium placed in the medium placement section, and also has a light receiving section that can receive reflected light from the medium. The light receiving axis of the light receiving section intersects part of the cabinet.

DESCRIPTION OF EXEMPLARY EMBODIMENTS

Figure 1:
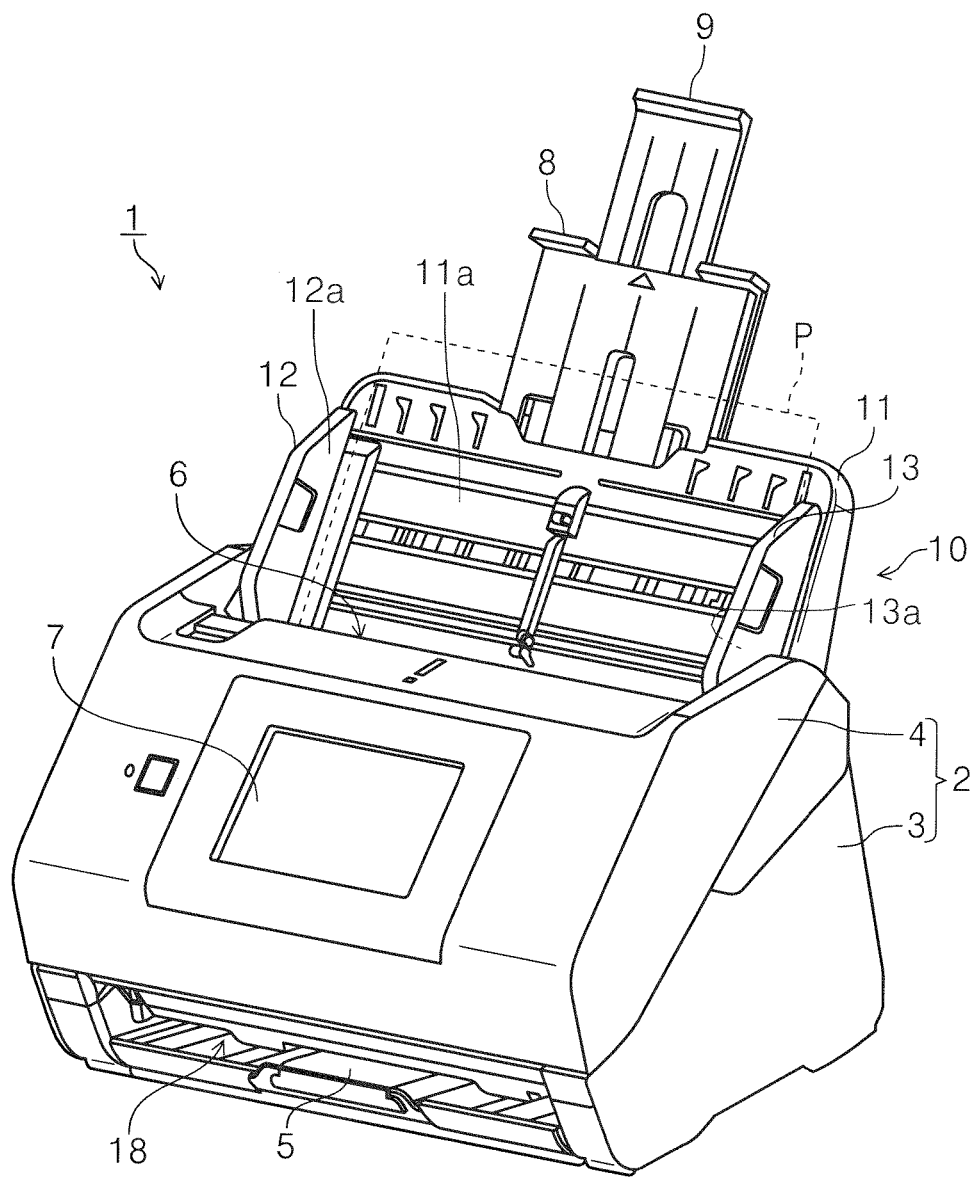
FIG. 1 is a perspective view illustrating the outside shape of a scanner.

The present disclosure will be outlined below.

A medium transport device according to a first aspect has: a cabinet in which a medium is transported; a medium placement section disposed so as to be exposed to the outside of the cabinet, the medium placement section having a placement surface on which the medium is placed before it is transported; a feeder disposed in the cabinet, the feeder feeding the medium in a transport direction by being rotated while in contact with a surface of the medium placed in the medium placement section, the surface facing the placement surface; and a two-dimensional sensor disposed in the medium placement section, the sensor detecting the motion of the medium in a two-dimensional coordinate system including a first axis and a second axis that extend along the placement surface. The two-dimensional sensor has a light emitting section that can emit light toward the medium placed in the medium placement section, and also has a light receiving section that can receive reflected light from the medium. The light receiving axis of the light receiving section intersects part of the cabinet.

In a case in which the two-dimensional sensor is disposed in the placement surface of the medium placement section disposed so as to be exposed to the outside of the cabinet, when no medium is placed on the placement surface, light from the outside of the medium transport device such as illumination enters the light receiving section. This may cause the two-dimensional sensor to incorrectly detect that a medium is present on the placement surface.

In this aspect, the light receiving axis of the light receiving section is disposed so as to intersect part of the cabinet.

When no medium is placed on the placement surface, therefore, it is possible to restrain light from the outside of the medium transport device from directly entering the light receiving section. This makes it possible to suppress incorrect detection by the two-dimensional sensor.

According to a second aspect, in the first aspect, the light receiving section is disposed at a position that is one step down from the placement surface of the medium placement section.

In this aspect, it is possible to reduce the risk that the light receiving section receives light from the outside of the cabinet.

According to a third aspect, in the second embodiment, the light receiving section is disposed in a concave portion having inner walls on which a reflection suppression process has been performed.

In this aspect, the light receiving section is disposed in a concave part having inner walls on which a reflection suppression process has been performed. This makes it hard for the light receiving section to receive light other than light propagating along the light receiving axis. Therefore, it is possible to reduce the risk that the light receiving section receives unnecessary light.

According to a fourth aspect, in any one of the first aspect to the third aspect, the medium transport device has a controller that can execute first control to control the operation of the feeder according to a detection result from the two-dimensional sensor and second control to control the operation of the feeder without a detection result from the two-dimensional sensor being taken into consideration. The controller acquires a detection image formed according to the amount of light received by the light receiving section, and when a detection image formed while the feeder is operating matches a reference image that is a detection image formed when no medium is placed in the medium placement section, executes the second control.

When the detection image formed while the feeder is operating matches the reference image, the controller can decide that no medium is placed in the medium placement section. In this specification, a match between the detection image and the reference image is not limited to a complete match. A match is also true when the detection image essentially matches the reference image with error taken into consideration.

In a state in which, for example, the last medium placed in the medium placement section had been transported and the rear edge of the medium has passed above the two-dimensional sensor, even when the feeder is operating, no medium is present above the two-dimensional sensor.

When detection by the two-dimensional sensor is performed in a state in which no medium is present above the two-dimensional sensor, incorrect detection is likely to occur due to the effect of light from the outside of the medium transport device, so incorrect detection may occur while the feeder is still operating. In the first control, which is performed according to a detection result from the two-dimensional sensor, the medium may not be appropriately transported due to the incorrect detection.

In this aspect, the controller acquires a detection image formed according to the amount of light received by the light receiving section, and when a detection image formed while the feeder is operating matches a reference image that is a detection image formed when no medium is placed in the medium placement section, executes the second control. Therefore, when the medium transport device goes into a state in which the feeder is operating but the medium is no longer present above the two-dimensional sensor, the medium is transported without a detection result from the two-dimensional sensor being taken into consideration, after which it is possible to suppress the medium transport problem due to incorrect detection by the two-dimensional sensor.

According to a fifth aspect, in the forth aspect, a reference pattern corresponding to the reference image is provided in an area that the light receiving axis intersects in the cabinet.

In this aspect, a reference pattern corresponding to the reference image is provided in an area that the light receiving axis intersects in the cabinet. Therefore, it is possible for the controller to more reliably decide a case in which the detection image matches the reference image as a state in which no medium is placed in the medium placement section.

According to a sixth aspect, in the forth or fifth aspect, the light emitting section is disposed so that its light emitting axis intersects part of the cabinet and that light emitted from the light emitting section reflects on the cabinet and reflected light enters the light receiving section.

When no medium is placed in the medium placement section, light to be received by the light receiving section is affected by an environment in which the medium transport device is installed. Therefore, the reference image may change depending on the installation environment. When, for example, illumination in the installation environment is dark, the reference image is also darkened, in which case the presence or absence of the medium in the medium placement section may not be appropriately detected.

In this aspect, the light emitting section is disposed so that its light emitting axis intersects part of the cabinet and that light emitted from the light emitting section reflects on the cabinet and reflected light enters the light receiving section. Therefore, when no medium is placed on the placement surface, the light receiving section receives reflected light that is light that has been emitted from the light emitting section and reflected on the cabinet.

Thus, regardless of the environment in which the medium transport device is disposed, the main of light received by the light receiving section with no medium placed on the placement surface is reflected light formed when light emitted from the light emitting section is reflected on the cabinet. This makes it possible to reduce a difference in the reference image due to the difference in the installation environment of the medium transport device. Therefore, it is possible to more reliably decide a case in which the controller receives the reference image as a state in which no medium is placed in the medium placement section.

A medium transport device according to a seventh aspect has: a cabinet in which a medium is transported; a medium placement section disposed so as to be exposed to the outside of the cabinet, the medium placement section having a placement surface on which the medium is placed before it is transported; a feeder that feeds the medium in a transport direction by being rotated while in contact with a surface of the medium placed in the medium placement section, the surface facing the placement surface; and a two-dimensional sensor disposed in the placement surface, the sensor detecting the motion of the medium in a two-dimensional coordinate system including a first axis and a second axis. The two-dimensional sensor has a light emitting section that can emit light toward the medium placed in the medium placement section, and also has a light receiving section that can receive reflected light from the medium. The light emitting section is disposed so that its light emitting axis intersects part of the cabinet and that light emitted from the light emitting section reflects on the cabinet and reflected light enters the light receiving section. The medium transport device has a controller that can execute first control to control the operation of the feeder according to a detection result from the two-dimensional sensor and second control to control the operation of the feeder without a detection result from the two-dimensional sensor being taken into consideration. The controller acquires a detection image formed according to the amount of light received by the light receiving section, and when a detection image formed while the feeder is operating matches a reference image that is a detection image formed when no medium is placed in the medium placement section, executes the second control.

When the detection image formed while the feeder is operating matches the reference image, the controller can decide that no medium is placed in the medium placement section.

When no medium is placed in the medium placement section, light to be received by the light receiving section is affected by an environment in which the medium transport device is installed. Therefore, the reference image may change depending on the installation environment. When, for example, illumination in the installation environment is dark, the reference image is also darkened, in which case the presence or absence of the medium in the medium placement section may not be appropriately detected.

In this aspect, the light emitting section is disposed so that its light emitting axis intersects part of the cabinet. Therefore, when no medium is placed on the placement surface, the light receiving section receives reflected light that is light that has been emitted from the light emitting section and reflected on the cabinet.

Thus, regardless of the environment in which the medium transport device is disposed, the main of the light received by the light receiving section with no medium placed on the placement surface is reflected light formed when light emitted from the light emitting section is reflected on the cabinet. This makes it possible to reduce a difference in the reference image due to the difference in the installation environment of the medium transport device. Therefore, it is possible to more reliably decide a case in which the detection image matches the reference image as a state in which no medium is placed in the medium placement section.

In an eighth aspect, the light receiving axis of the light receiving section in the medium transport device in the sixth or seventh aspect intersects an opposing portion that faces the feeder in the cabinet.

The opposing portion that faces the feeder in the cabinet faces downward. This makes it hard for light from the outside of the medium transport device such as illumination to be directed to the opposing portion. Therefore, it is possible to reduce the risk that light from the outside of the medium transport device is reflected on the opposing portion and reflected light arrives at the light receiving section.

An image reading apparatus in a ninth aspect has a reading section that reads a medium and also has the medium transport device, in any one of the first to eight aspects, that transports the medium toward the reading section.

In the image reading apparatus, in this aspect, that has a reading section that reads a medium and also has the medium transport device, in any one of the first to eight aspects, that transports the medium toward the reading section, effects similar to those in any one of the first to eight aspects can be obtained.

First Embodiment

First, an image reading apparatus according to a first embodiment of the present disclosure will be outlined below.

In this embodiment, a document scanner 1 as illustrated in FIG. 1 is taken as an example of the image reading apparatus. The document scanner 1 can read at least one of the front surface and rear surface of paper P used as a medium. The document scanner 1 will be simply referred to below as the scanner 1.

In the X-Y-Z coordinate system indicated in each drawing, the X direction is the width direction of the image reading apparatus and is also the width direction of a medium that is a direction intersecting the medium transport direction. The Y direction is the medium transport direction. The Z direction, which intersects the Y direction, indicates a direction substantially orthogonal to a surface of the paper P to be transported. The +Y direction is a direction from the back of the image reading apparatus toward the front of the image reading apparatus, and the −Y direction is a direction from the front of the image reading apparatus toward the back of the image reading apparatus. The left direction and right direction when viewed from in front of the image reading apparatus are respectively the +X direction and the −X direction. The +Z direction is toward the top of the image reading apparatus, and the −Z direction is toward the bottom of the image reading apparatus. A direction in which paper P is supplied (+Y direction) is a direction toward the downstream, and the opposite direction (−Y direction) is a direction toward the upstream.

Outline of the Scanner

The scanner 1 according to the present disclosure will be described with reference mainly to FIGS. 1 and 2.

The scanner 1 illustrated in FIG. 1 has a reading section 20 (see FIG. 2) that reads paper P (medium) and a medium transport device 10 that transports the paper P toward the reading section 20. In this embodiment, a device in which the reading section 20 having a reading function is eliminated from the scanner 1 can be considered as the medium transport device 10.

Figure 2:
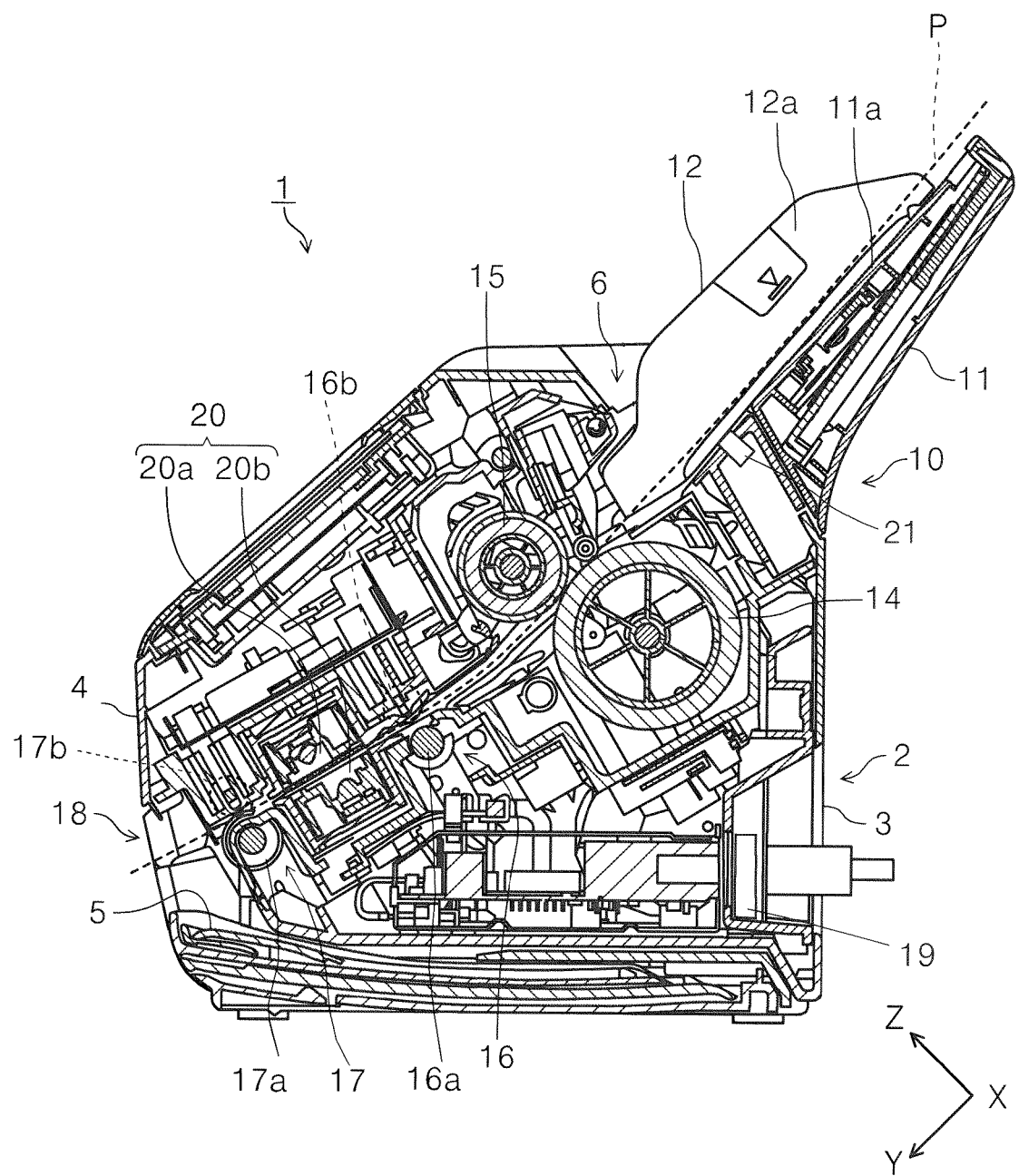
FIG. 2 is a side cross-sectional view illustrating a paper transport path in the scanner.

The medium transport device 10 has a cabinet 2 in which paper P is transported, a medium placement section 11 disposed so as to be exposed to the outside of the cabinet 2, a supply roller 14 disposed in the cabinet 2 as a feeder, and a two-dimensional sensor 21 disposed in the medium placement section 11, as illustrated in FIG. 2. The two-dimensional sensor 21 will be described later in detail.

The cabinet 2 forms the outside shape of the scanner 1. The reading section 20 is disposed in the cabinet 2.

The cabinet 2 includes a lower unit 3 and an upper unit 4. The upper unit 4 is attached to the lower unit 3 so as to be openable with the downstream of the upper unit 4 in the paper transport direction acting as a swing fulcrum. Processing for a jam of paper P in the cabinet 2 can be easily performed by swinging the upper unit 4 toward the front of the scanner 1 to open the upper unit 4 so that a paper transport path for paper P is exposed.

The medium placement section 11, disposed behind the cabinet 2 (in the −Y direction), has a placement surface 11a on which paper P to be transported by the medium transport device 10 is placed. The medium placement section 11 can be structured so as to be attachable to and detachable from the cabinet 2.

The medium placement section 11 illustrated in FIG. 1 also has a pair of a first edge guide 12 and a second edge guide 13 that guide the side edges of paper P in the width direction (X-axis direction) with a first guide surface 12a and a second guide surface 13a facing each other.

The first edge guide 12 and second edge guide 13 are provided so as to be slidably moved in the X direction according to the size of paper P.

The medium placement section 11 has a first auxiliary paper support 8 and a second auxiliary paper support 9. The first auxiliary paper support 8 and second auxiliary paper support 9 are structured so that they can be stored in the medium placement section 11 as illustrated in FIG. 2, and can be drawn out of the medium placement section 11 as illustrated in FIG. 1, enabling the length of the placement surface 11a to be adjusted.

In the cabinet 2, the upper unit 4 has an operation panel 7 that implements a user interface (UI) through which various operations to make read settings and execute reading are performed and the read settings are indicated. In this embodiment, the operation panel 7 is a so-called touch panel on which both display and input can be performed, that is, the operation panel 7 doubles as an operation section used to perform various operations and a display section used to display various types of information.

A feed port 6 communicating with the cabinet 2 is formed at the top of the upper unit 4. Paper P placed in the medium placement section 11 is fed from the feed port 6 toward the reading section 20 in the cabinet 2.

A discharge port 18 and paper discharge tray 5 from which paper P is discharged after the reading section 20 has read the paper P are provided at the front of the lower unit 3.

About the Paper Transport Path in the Scanner

Next, the paper transport path in the scanner 1 will be described with reference to FIG. 2.

Paper P, which is an original to be read by the scanner 1, is set in the medium placement section 11.

The paper P set in the medium placement section 11 is fed to the transport path by the supply roller 14 (feeder).

A separation roller 15, which nips the paper P between the separation roller 15 and the supply roller 14 and separates the paper P, is provided at a position at which the separation roller 15 faces the supply roller 14.

The paper P placed in the medium placement section 11 is picked up and transported by the supply roller 14, which is rotatably attached to the lower unit 3. Specifically, the supply roller 14 rotates while in contact with a surface of the paper P placed in the medium placement section 11, the surface facing the placement surface 11a, and feeds the paper P in the +Y direction, which is the transport direction. When a plurality of paper sheets P are set in the medium placement section 11, they are transported sequentially from the lowest paper P.

A transport roller pair 16, the reading section 20, and a discharge roller pair 17 are provided downstream of the supply roller 14 in this order from the upstream.

The transport roller pair 16 transports the paper P fed by the supply roller 14 toward the reading section 20. The transport roller pair 16 is composed of a transport driving roller 16a and a transport driven roller 16b.

The reading section 20 has an upper read sensor 20a disposed in the upper unit 4 and a lower read sensor 20b disposed in the lower unit 3. In this embodiment, as an example, the upper read sensor 20a and lower read sensor 20b are each structured as a contact image sensor module (CISM).

An image on at least one of the front surface and rear surface of the paper P is read in the reading section 20, after which the paper P is nipped by the discharge roller pair 17 and is discharged from the discharge port 18 to the outside of the cabinet 2. The discharge roller pair 17 is composed of a discharge driving roller 17a and a discharge driven roller 17b.

In a state in which the paper discharge tray 5 disposed below the discharge port 18 is stored at the bottom of the lower unit 3 as illustrated in FIGS. 1 and 2, the paper discharge tray 5 can be drawn beyond the front of the scanner 1. The paper P discharged from the discharge port 18 can be stacked on the paper discharge tray 5 that has been drawn.

In this embodiment, the rotation of the supply roller 14, transport driving roller 16a, and discharge driving roller 17a are driven by at least one driving source (not illustrated) provided in the lower unit 3. The driving source for each roller is controlled by a controller 19. Therefore, the supply roller 14, transport driving roller 16a, and discharge driving roller 17a are controlled. That is, the controller 19 controls the transport of the paper P in the medium transport device 10.

About the Two-Dimensional Sensor

The two-dimensional sensor 21 disposed in the medium placement section 11 will be described below.

The two-dimensional sensor 21 faces the paper P at the bottom of a stack of paper sheets P placed in the medium placement section 11. The two-dimensional sensor 21 detects the motion of the paper P in a two-dimensional coordinate system that includes a first axis and a second axis that extend along the placement surface 11a of the medium placement section 11. When, as an example, the first axis is taken as the X-axis and the second axis is taken as the Y-axis, the movement of the paper P on an X-Y plane along the placement surface 11a can be detected by the two-dimensional sensor 21. More specifically, while the paper P at the bottom of a stack of paper sheets P placed in the medium placement section 11 is being transported by the operation of the supply roller 14, the two-dimensional sensor 21 can detect a skew of the paper P.

The two-dimensional sensor 21 is based on a principle that is the same as or similar to the principle of a sensor that can detect two-dimensional (planar) movement, the sensor being used in a mouse for a computer. For example, a known optical sensor that uses laser light, red light emitting diode (LED) light, blue LED light, infrared (IR), or the like can be used.

Figure 3:
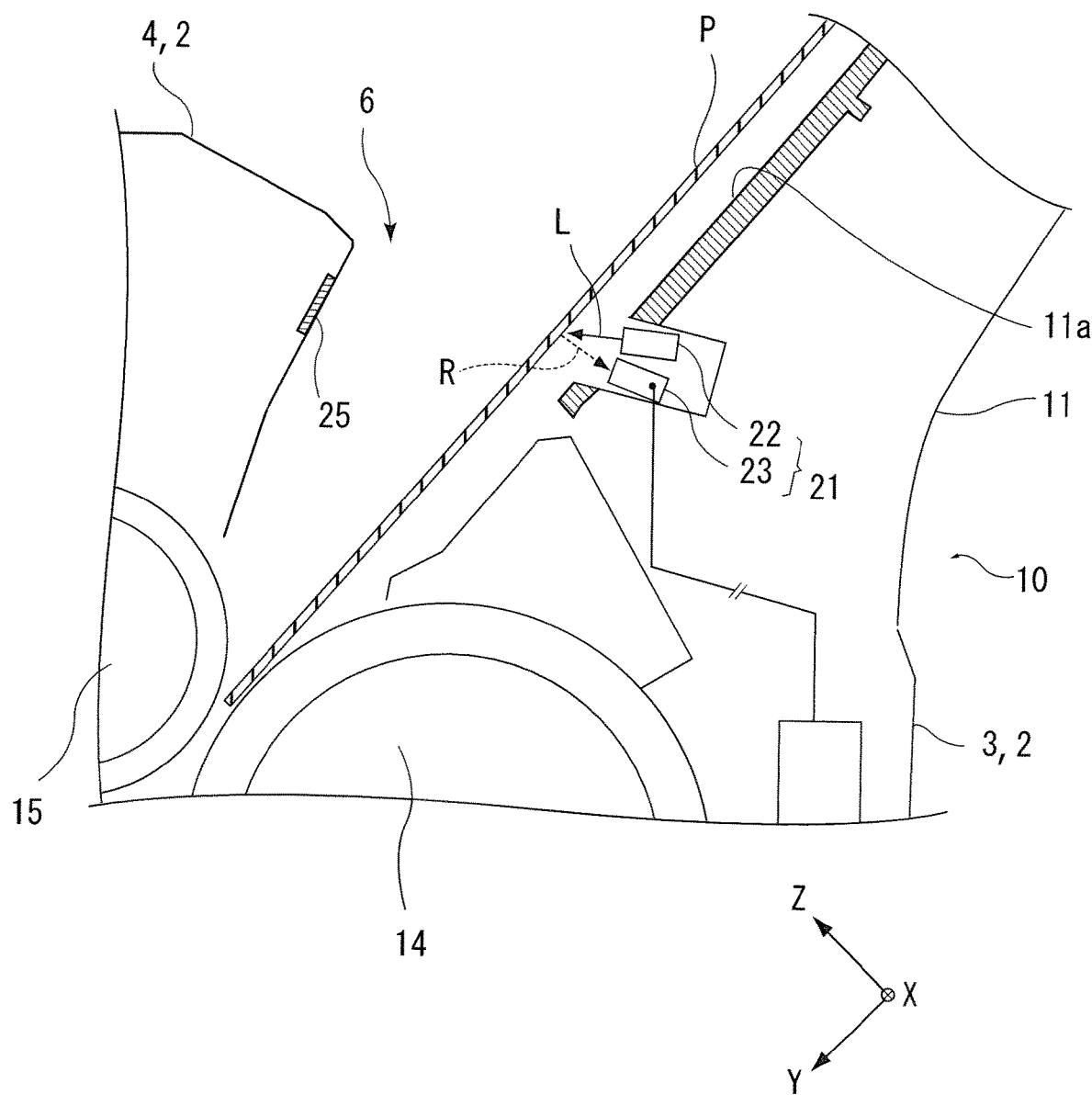
FIG. 3 is a schematic side cross-sectional view of the main elements of a medium transport device according to a first embodiment.

More specifically, the two-dimensional sensor 21 has a light emitting section 22 that can emit illuminating light L toward paper P placed in the medium placement section 11 and also has a light receiving section 23 that can receive reflected light R from the paper P, as illustrated in FIG. 3. In this embodiment, a light source that emits laser light is used as the light emitting section 22.

The light receiving section 23 is an image sensor. As the light receiving section 23, a complementary metal-oxide-semiconductor (CMOS) image sensor or a charge-coupled device (CCD) image sensor, for example, can be used. The light receiving section 23 is composed of a plurality of pixels arranged along the X-axis, which is the first axis, and the Y-axis, which is the second axis, orthogonal to the X-axis. The light receiving section 23 can form a detection image according to the amount of light received at each pixel.

In this embodiment, the amount of light received at the light receiving section 23 is sent to the controller 19. Then, the controller 19 forms a detection image according to the amount of light received. The controller 19 analyzes the detection image, obtains the amount of movement of the detection image in the first-axis direction (X-axis direction) and the amount of movement in the second-axis direction (Y-axis direction), and decides whether the paper P is skewed. A known method used for a mouse for a computer can be used as the image analysis method.

The amount of movement in the second-axis direction (Y-axis direction), which is along the transport direction, is equivalent to the amount of transport of the paper P in the transport direction. After the paper P has been transported by a predetermined amount of transport, when the amount of movement in the first-axis direction (X-axis direction) is zero or less than a predetermined amount of movement, the controller 19 can decide that the paper P is being appropriately transported without being skewed. However, after the paper P has been transported by the predetermined amount of transport, when the amount of movement in the first-axis direction (X-axis direction) is equal to or more than the predetermined amount of movement the controller 19 can decide that the paper P is skewed.

The controller 19 can also decides, from a detection result from the two-dimensional sensor 21, whether paper P is present in the medium placement section 11.

More specifically, a detection image formed when no paper P is present in the medium placement section 11 is stored in advance as a reference image. When the detection image matches the reference image, the controller 19 can decides that no paper P is present in the medium placement section 11.

A match between the detection image and the reference image can be recognized by processing in which a known pattern matching method is used. When a ratio of the match of the detection image with the reference image is equal to or more than a predetermined ratio, for example, the controller 19 can recognize that the detection image matches the reference image.

The controller 19 can execute first control to control the operation of the supply roller 14 according to a detection result from the two-dimensional sensor 21 and second control to control the operation of the supply roller 14 without a detection result from the two-dimensional sensor 21 being taken into consideration. First control and second control will be described later in detail.

Although, in this embodiment, the two-dimensional sensor 21 has been structured so as to output the amount of light received at the light receiving section 23 to the controller 19, this is not a limitation. An auxiliary controller (not illustrated) may be provided in the two-dimensional sensor 21. Then, the auxiliary controller may form a detection image according to the amount of light received at the light receiving section 23, may analyze the detection image, and may output the amount of movement of the detection image in the first-axis direction (X-axis direction) and the amount of movement in the second-axis direction (Y-axis direction) to the controller 19 as detection values. Alternatively, the auxiliary controller may decide whether the detection image matches the reference image and may output a decision result to the controller 19. The controller 19 may execute first control or second control according to the output result from the auxiliary controller.

Figure 4:
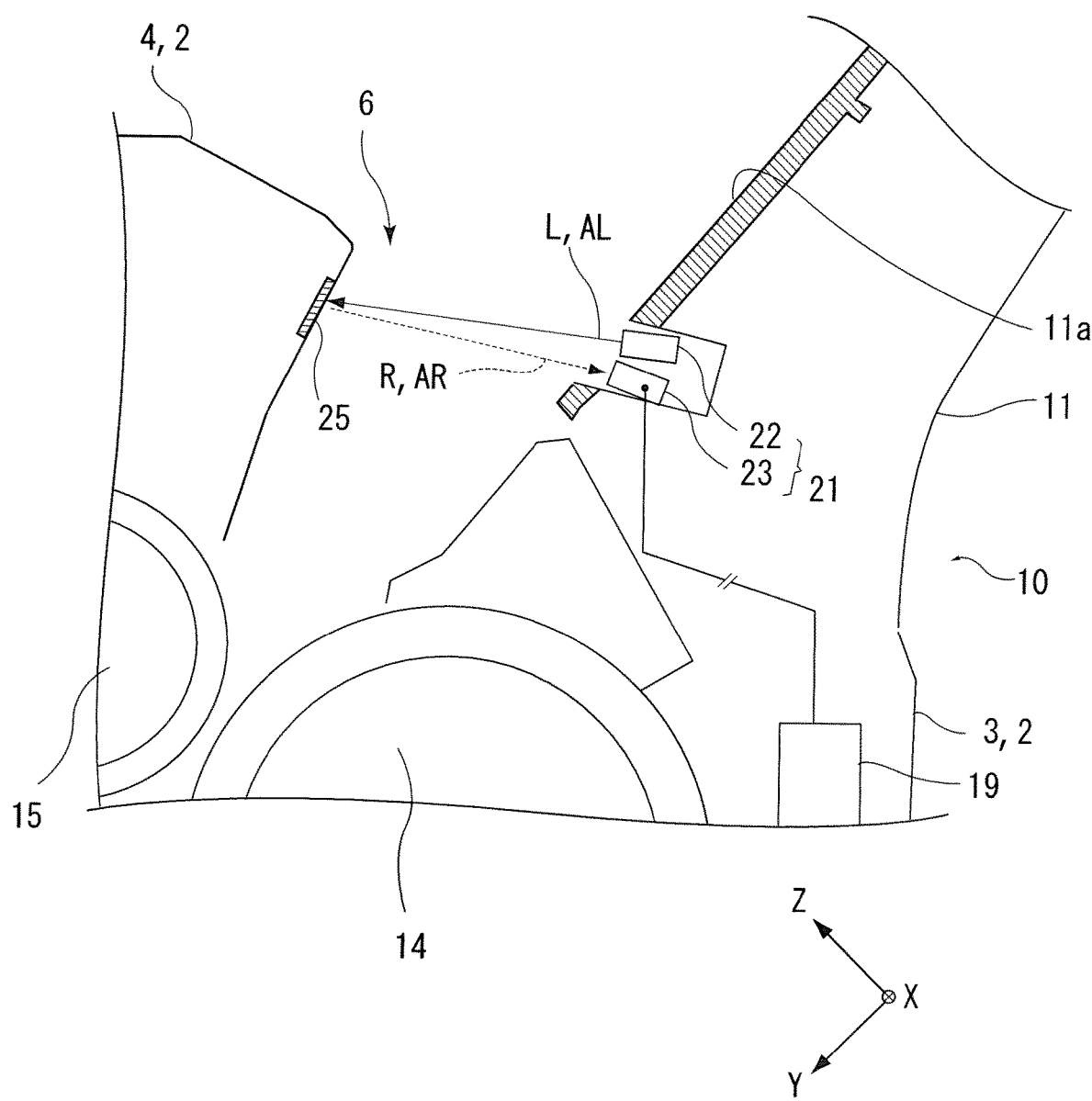
FIG. 4 is another schematic side cross-sectional view of the main elements of the medium transport device according to the first embodiment.

As illustrated in FIG. 4, the light receiving axis AR of the light receiving section 23 intersects part of the cabinet 2. More specifically, the light receiving axis AR intersects an opposing portion 25 that faces the supply roller 14 in the cabinet 2.

The two-dimensional sensor 21 is disposed in the placement surface 11a exposed to the outside of the cabinet 2. Therefore, when no paper P is placed in the medium placement section 11, light from the outside of the medium transport device 10 such as illumination enters the light receiving section 23. This may cause the two-dimensional sensor 21 to incorrectly detect that paper P is present in the medium placement section 11.

However, since the light receiving axis AR of the light receiving section 23 intersects part of the cabinet 2, it is possible to restrain light from the outside of the medium transport device 10 from directly entering the light receiving section 23. This makes it possible to suppress incorrect detection by the two-dimensional sensor 21.

In the cabinet 2, the opposing portion 25 that faces the supply roller 14 faces downward. This makes it hard for light from the outside of the medium transport device 10 such as illumination to be directed to the opposing portion 25. Therefore, since the light receiving axis AR intersects the opposing portion 25, it is possible to reduce the risk that light from the outside of the medium transport device 10 is reflected on the opposing portion 25 and reflected light arrives at the light receiving section 23.

The light emitting section 22 is placed so that its light emitting axis AL intersects the opposing portion 25, which is part of the cabinet 2, in such a way that illuminating light L emitted from the light emitting section 22 is reflected on the opposing portion 25 (cabinet 2) and reflected light R enters the light receiving section 23, as illustrated in FIG. 4.

About Control by the Controller

Next, first control and second control executed by the controller 19 will be described with reference to the flowchart illustrated in FIG. 5.

Figure 5:
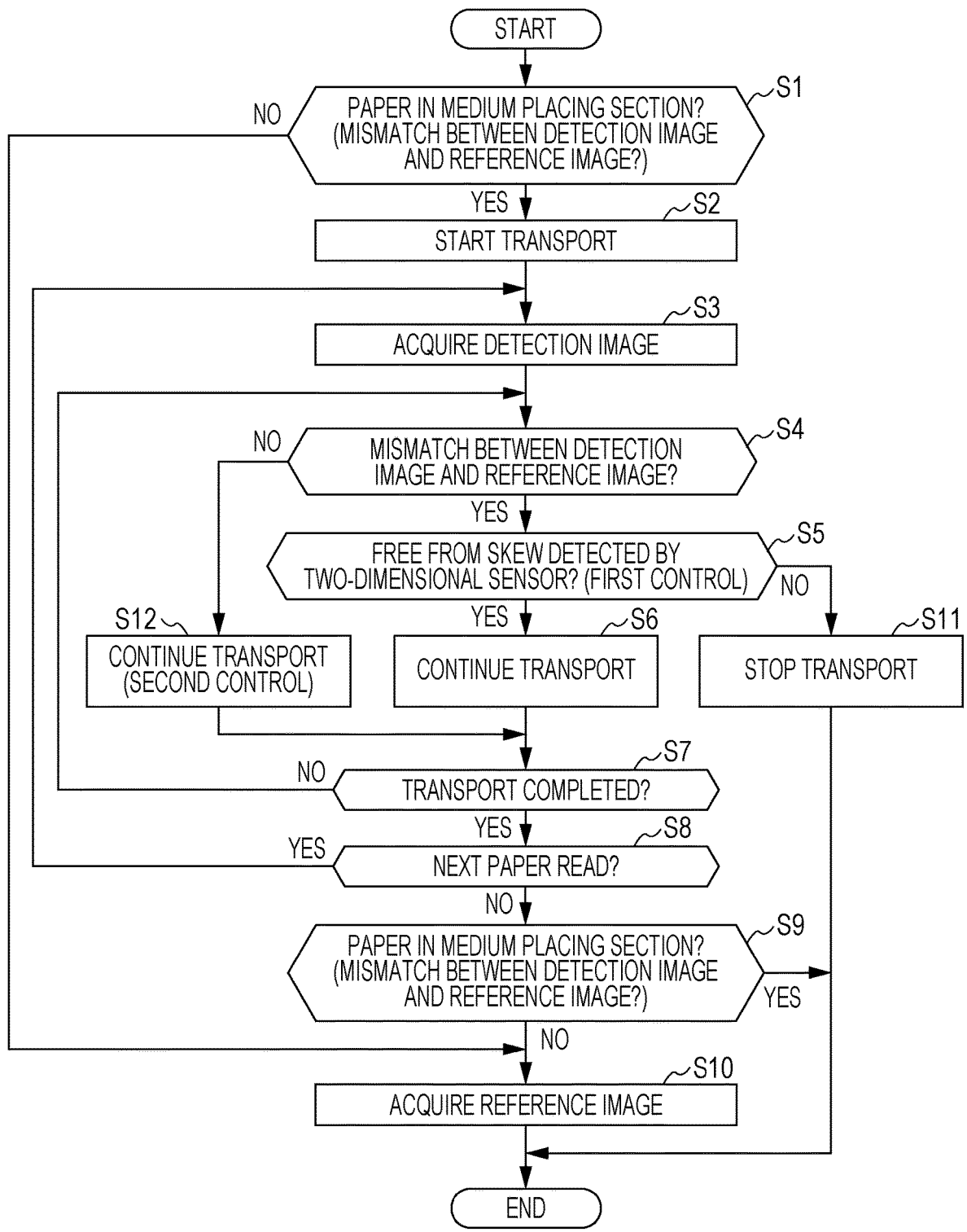
FIG. 5 is a flowchart representing control by a controller.

The controller 19 starts a flow illustrated in FIG. 5 when, for example, the scanner 1 is powered on.

First, the controller 19 decides, in step S1, whether paper P is placed in the medium placement section 11. That is, the controller 19 decides whether a detection image formed according to the amount of light received at the light receiving section 23 in the two-dimensional sensor 21 differs from the reference image (whether there is a mismatch between the detection image and the reference image). An initial reference image stored in the controller 19 in advance or a previous reference image acquired during execution of the previous scanning can be used as the reference image referenced in step S1.

When the result in step S1 is Yes, that is, the detection image differs from the reference image, the controller 19 decides that paper P is placed in the medium placement section 11. Processing executed when the result in step S1 is No will be described later.

When paper P is placed in the medium placement section 11, transport starts in response to a command to start scanning, the command being entered by the user on the operation panel 7 (step S2).

The controller 19 acquires a detection image according to the amount of light received at the light receiving section 23 while the paper P is being transported (step S3), after which the controller 19 decides whether the acquired detection image differs from the reference image used in step S1 (whether there is a mismatch between the detection image and the reference image) (step S4).

When the result in step S4 is Yes, that is, the detection image differs from the reference image, the controller 19 proceeds to step S5 and performs first control in which a detection result from the two-dimensional sensor 21 is taken into consideration. When the result in step S4 is No, that is, the detection image matches the reference image, the controller 19 proceeds to step S12 and performs second control in which a detection result from the two-dimensional sensor 21 is not taken into consideration. Second control in step S12 will be described below after first control is described.

In first control in step S5, the controller 19 detects the movement of the paper P in the first-axis direction (X-axis direction) according to the amount of light received at the light receiving section 23 and decides whether the paper P to be transported is skewed. When the movement of the paper P in the first-axis direction is less than a predetermined distance, the controller 19 decides that the paper P has not been skewed. When the movement is equal to or more than the predetermined distance, the controller 19 decides that the paper P has been skewed.

When the result in step S5 is No, that is, a skew has occurred, the controller 19 stops a transporter including the supply roller 14 and the like to stop the transport of the paper P (step S11). When stopping transport, the controller 19 can issue an error alert with a sound or a lamp.

When the result in step S5 is Yes, that is, a skew has not occurred, the controller 19 continues the transport (step S6). In step S6, the transport is continued until the controller 19 produces a Yes result in step S7 in which the controller 19 decides whether the transport of the paper P has been completed. When the controller 19 produces a No result in step S7, the controller 19 returns to step S6 and continues the transport.

When the transport of the paper P has been completed (the result in step S7 is Yes), the controller 19 decides whether next paper P to be transported is present (step S8). When next paper P to be transported is present (the result in step S8 is Yes), the controller 19 returns to step S3 and transports the next paper P. When next paper P to be transported is not present (the result in step S8 is No), the controller 19 proceeds to step S9 and decides whether paper P is present in the medium placement section 11. That is, the controller 19 acquires a detection image according to the amount of light received at the light receiving section 23 and decides whether the acquired detection image differs from the reference image used in step S1 (whether there is a mismatch between the detection image and the reference image).

When paper P is present in the medium placement section 11 (the result in step S9 is Yes), the controller 19 terminates the control. When no paper P is present in the medium placement section 11 (the result in step S9 is No), the controller 19 acquires a new reference image (step S10) and terminates the control.

Next, second control in step S12, which is executed when the detection image formed while the supply roller 14 is operating matches the reference image (the result in step S4 is No) will be described. In first control in step S5 described above, when a skew was detected according to a detection result from the two-dimensional sensor 21, transport has been stopped. In second control in step S12, however, the controller 19 continues the transport of the paper P without a detection result from the two-dimensional sensor 21 being taken into consideration. After step S12, the controller 19 proceeds to step S7. Step S7 and later steps are common to first control in step S5 and second control, so these steps will not be described.

Non-consideration of a detection result from the two-dimensional sensor 21 is achieved not only when the controller 19 does not use a detection result even when the two-dimensional sensor 21 has performed detection but also when detection by the two-dimensional sensor 21 is stopped so that a detection result is not obtained.

As described above, when the detection image formed while the supply roller 14 is operating matches the reference image, the controller 19 decides that no paper P is placed in the medium placement section 11.

When, for example, the last one of a plurality of paper sheets P placed in the medium placement section 11 had been transported and the rear edge of the paper P has passed above the two-dimensional sensor 21, no paper P is present above the two-dimensional sensor 21 in spite of the supply roller 14 being in operation.

When detection by the two-dimensional sensor 21 is performed with no paper P present above the two-dimensional sensor 21, light from the outside of the medium transport device 10 enters the light receiving section 23 and incorrect detection is thereby likely to occur. This may cause incorrect detection while the supply roller 14 is operating. Under first control based on a detection result from the two-dimensional sensor 21, paper P may not be appropriately transported due to this incorrect detection.

In this embodiment, however, second control is executed when the detection image formed while the supply roller 14 is operating matches the reference image (the result in step S4 is No). When the last paper P is no longer present above the two-dimensional sensor 21 in spite of the supply roller 14 being in operation, the paper P is transported without a detection result from the two-dimensional sensor 21 being taken into consideration. This can suppress the problem with the transport of paper P due to incorrect detection by the two-dimensional sensor 21, which would otherwise be caused after that.

Returning to the beginning of the flowchart, when the result in step S1 is No, that is, the detection image matches the reference image, no paper P is placed in the medium placement section 11. Then, the controller 19 proceeds to step S10 and acquires a reference image in the current installation environment for the medium transport device 10. This makes the medium transport device 10 ready for transport of next paper P.

With no paper P placed in the medium placement section 11, light received by the light receiving section 23 is affected by the installation environment for the medium transport device 10, so the reference image may change depending on the installation environment. When, for example, illumination in the installation environment is dark, the reference image is also darkened, in which case the presence or absence of the paper P in the medium placement section 11 may not be appropriately detected.

In this embodiment, however, the light emitting section 22 is placed so that the light emitting axis AL intersects the opposing portion 25 in such a way that illuminating light L emitted from the light emitting section 22 is reflected on the opposing portion 25 and reflected light R enters the light receiving section 23, as illustrated in FIG. 4. When no paper P is placed in the medium placement section 11, therefore, the light receiving section 23 receives the reflected light R.

Thus, regardless of the environment in which the medium transport device 10 is disposed, the main of the light received by the light receiving section 23 with no paper P placed in the medium placement section 11 is reflected light R that is light formed when illuminating light L emitted from the light emitting section 22 is reflected on the opposing portion 25. This makes it possible to reduce a difference in the reference image due to the difference in the installation environment of the medium transport device 10. Therefore, it is possible for the controller 19 to more reliably decide a case in which the detection image matches the reference image as a state in which no paper P is placed in the medium placement section 11.

A reference pattern corresponding to the reference image can be provided in the opposing portion 25, which is an area that the light receiving axis AR intersects in the cabinet 2. Examples of the reference pattern include patterns of, for example, vertical, horizontal or oblique stripes, characteristic patterns such as lattice patterns, and figures with different color schemes and different brightness levels.

Due to this structure, the reference image becomes a characteristic image based on the reference pattern. Therefore, it is possible for the controller 19 to more reliably decide a case in which the detection image matches the reference image as a state in which no paper P is placed in the medium placement section 11.

When illumination in the environment in which the medium transport device 10 is installed is illumination of a fluorescent lamp, the reference image may not be stabilized because the fluorescent lamp flickers. To allow for this situation, a plurality of reference image may be acquired at intervals of a predetermined length of time, one at each time. Then, it is possible to decide a case in which the detection image matches any one of the plurality of reference image as a state in which no paper P is placed in the medium placement section 11.

Second Embodiment

A medium transport device 10A according to a second embodiment will be described with reference to FIG. 6.

In the second and subsequent embodiments, component elements that are the same as in the first embodiment will be given the same reference characters and descriptions of these component elements will be omitted.

Figure 6:
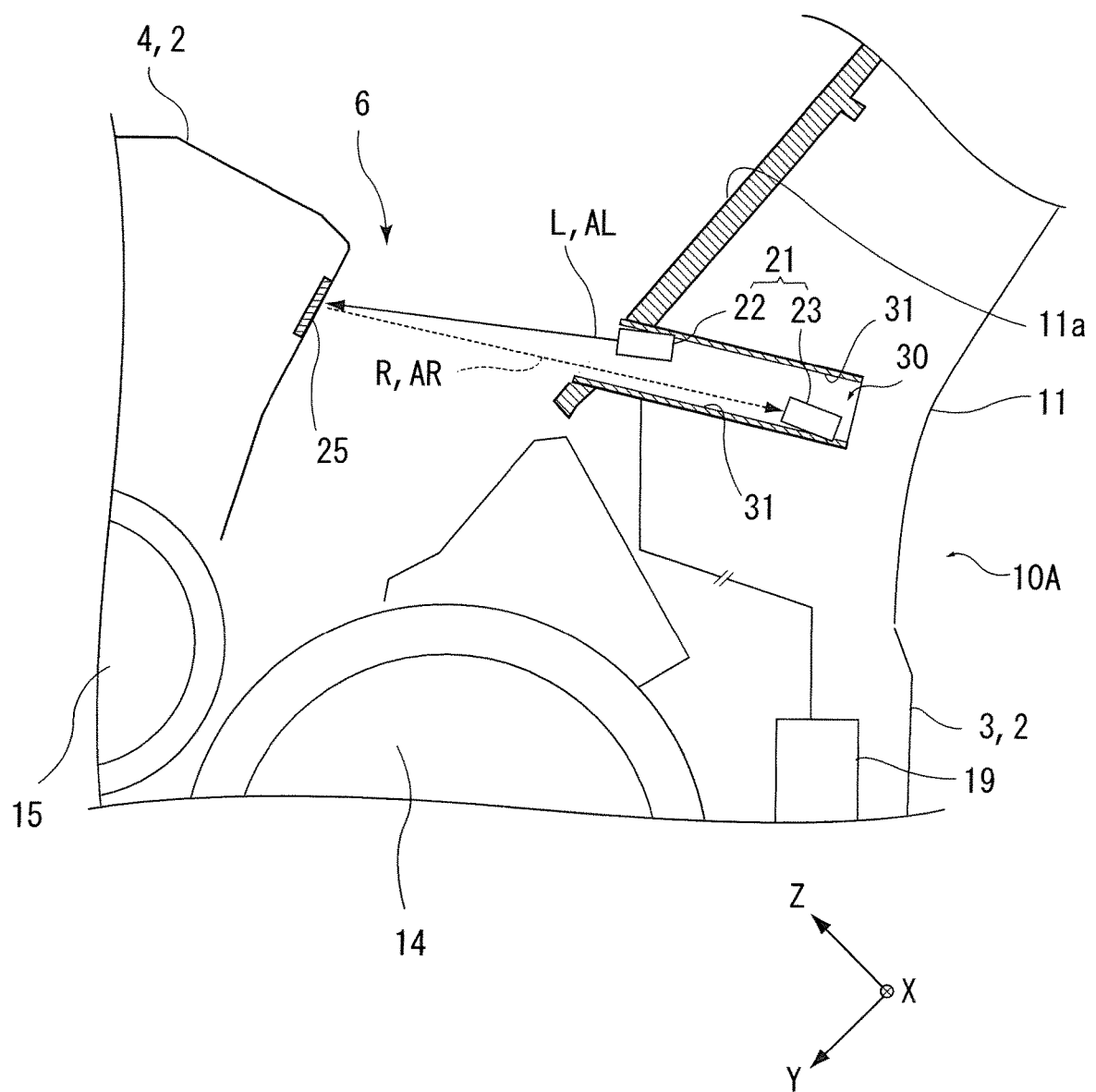
FIG. 6 is a schematic side cross-sectional view of the main elements of a medium transport device according to a second embodiment.

In the medium transport device 10A illustrated in FIG. 6, the light receiving section 23 in the two-dimensional sensor 21 is disposed at a position that is one step down from the placement surface 11a of the medium placement section 11. More specifically, the light receiving section 23 is disposed at a deep position in a concave portion 30 having inner walls 31.

Since the light receiving section 23 is disposed at a deep position to reduce light from the outside of the medium transport device 10A, it is possible to reduce the risk that the reference image formed when no paper P is placed in the medium placement section 11 is affected by light from the outside of the medium transport device 10A.

A reflection suppression process has been performed on the inner walls 31 of the concave portion 30. In examples of the reflection suppression process, the inner walls 31 are painted in a dark color such as black, a material having a reflection suppression effect is pasted to the inner walls 31, convex and concave portions or ridges and valley are formed on and in the inner walls 31, and machining to make surfaces coarse such as matting or graining is performed on the inner walls 31.

Since the light receiving section 23 is disposed in the concave portion 30 having the inner walls 31 on which a reflection suppression process has been performed, this makes it hard for the light receiving section 23 to receive light other than light propagating along the light receiving axis AR. Therefore, it is possible to reduce the risk that the light receiving section 23 receives unnecessary light.

Third Embodiment

A medium transport device 10B according to a third embodiment will be described with reference to FIG. 7.

Figure 7:
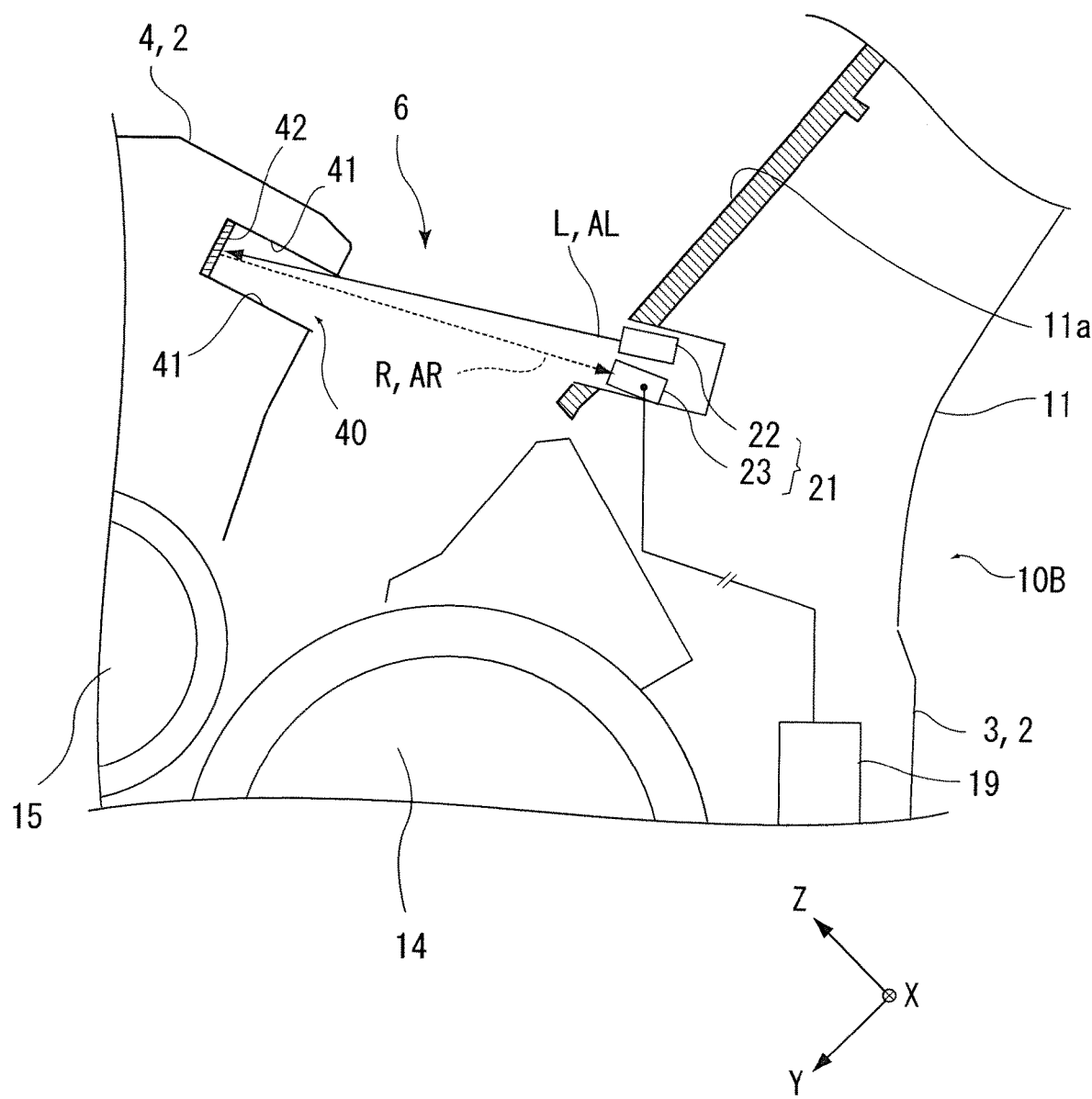
FIG. 7 is a schematic side cross-sectional view of the main elements of a medium transport device according to a third embodiment.

In the medium transport device 10B illustrated in FIG. 7, the light emitting axis AL of the light emitting section 22 in the two-dimensional sensor 21 intersects the interior of a concave portion 40 formed in the cabinet 2 and reflected light R is received by the light receiving section 23. In this embodiment, the light emitting axis AL intersects the bottom 42 of the concave portion 40. However, the light emitting axis AL may intersect an inner wall 41 of the concave portion 40.

Variation

In the cabinet 2, a reflection suppression process may be performed on an area that the light emitting axis AL intersects such as the opposing portion 25 in the first and second embodiments or the bottom 42 of the concave portion 40 in the third embodiment. Alternatively, a reflection suppression process may be performed on the inner walls 41 of the concave portion 40.

The opposing portion 25 in the first and second embodiments and the bottom 42 of the concave portion 40 in the third embodiment may be formed so that the angle of the opposing portion 25 and inner wall 41 can be changed. Then, a switchover can be made between a state in which the reflected light R is received at the light receiving section 23 and a state in which the reflected light R is not received.

In the above embodiments, the supply roller 14 and two-dimensional sensor 21 face the paper P at the bottom of a stack of paper sheets P in the medium placement section 11. However, the supply roller 14 and two-dimensional sensor 21 may face the paper P at the top of the stack of paper sheets P in the medium placement section 11.

So far, the first to third embodiments have been described, but the present disclosure is not limited to these embodiments. Various variations are possible without departing from the intended scope of the present disclosure described in the claims. It will be understood that these variations are also included in the range of the present disclosure.

The medium transport device in the present disclosure can be provided not only in an image reading apparatus typified by a scanner but also in a recording apparatus typified by a printer.

What is claimed is:
1. A medium transport device comprising:
a cabinet in which a medium is transported;
a medium placement section disposed so as to be exposed to an outside of the cabinet, the medium placement section having a placement surface on which the medium is placed before the medium is transported;
a feeder disposed in the cabinet, the feeder feeding the medium in a transport direction by being rotated while in contact with a surface of the medium placed in the medium placement section, the surface facing the placement surface; and
a two-dimensional sensor disposed in the medium placement section, the sensor detecting motion of the medium in a two-dimensional coordinate system including a first axis and a second axis that extend along the placement surface; wherein
the two-dimensional sensor has a light emitting section configured to emit light toward the medium placed in the medium placement section, and also has a light receiving section configured to receive reflected light from the medium, and
a light receiving axis of the light receiving section intersects part of the cabinet,
wherein the light receiving section is disposed at a position that is further below the placement surface of the medium placement section than the light emitting section.

2. The medium transport device according to claim 1, wherein the light receiving section is disposed in a concave portion having an inner wall on which a reflection suppression process has been performed.

3. The medium transport device according to claim 1, further comprising a controller configured to execute first control to control operation of the feeder according to a detection result from the two-dimensional sensor and second control to control operation of the feeder without a detection result from the two-dimensional sensor being taken into consideration, wherein the controller acquires a detection image formed according to an amount of light received by the light receiving section, and when a detection image formed while the feeder is operating matches a reference image that is a detection image formed when no medium is placed in the medium placement section, executes the second control.

4. The medium transport device according to claim 3, wherein a reference pattern corresponding to the reference image is provided in an area that the light receiving axis intersects in the cabinet.

5. The medium transport device according to claim 3, wherein the light emitting section is disposed so that a light emitting axis of the light emitting section intersects part of the cabinet and that light emitted from the light emitting section reflects on the cabinet and reflected light enters the light receiving section.

6. A medium transport device comprising:
a cabinet in which a medium is transported;
a medium placement section disposed so as to be exposed to an outside of the cabinet, the medium placement section having a placement surface on which the medium is placed before the medium is transported;
a feeder that feeds the medium in a transport direction by being rotated while in contact with a surface of the medium placed in the medium placement section, the surface facing the placement surface; and
a two-dimensional sensor disposed in the placement surface, the sensor detecting motion of the medium in a two-dimensional coordinate system including a first axis and a second axis; wherein the two-dimensional sensor has a light emitting section configured to emit light toward the medium placed in the medium placement section, and also has a light receiving section configured to receive reflected light from the medium, the light emitting section being disposed so that a light emitting axis of the light emitting section intersects part of the cabinet and that light emitted from the light emitting section reflects on the cabinet and reflected light enters the light receiving section, the medium transport device has a controller configured to execute first control to control operation of the feeder according to a detection result from the two-dimensional sensor and second control to control operation of the feeder without a detection result from the two-dimensional sensor being taken into consideration, and the controller acquires a detection image formed according to an amount of light received by the light receiving section, and when a detection image formed while the feeder is operating matches a reference image that is a detection image formed when no medium is placed in the medium placement section, executes the second control.

7. The medium transport device according to claim 5, wherein the light receiving axis of the light receiving section intersects an opposing portion that faces the feeder in the cabinet.

8. An image reading apparatus comprising:
a reading section that reads a medium; and
the medium transport device, according to claim 1, that transports the medium toward the reading section.

* * * * *